United States Patent [19]

Devon

[11] Patent Number: 5,790,295

[45] Date of Patent: Aug. 4, 1998

[54] GATED INTEGRATOR PREAMPLIFIER FOR INFRARED DATA NETWORKS

[75] Inventor: Mark Daryl Devon, San Jose, Calif.

[73] Assignee: Apple Computer, Inc., Cupertino, Calif.

[21] Appl. No.: 519,751

[22] Filed: Aug. 28, 1995

[51] Int. Cl.[6] .................................................. H04B 10/06
[52] U.S. Cl. ........................... 359/189; 330/59; 330/308; 250/214 A
[58] Field of Search .................... 359/189, 190, 359/191, 192, 194, 195; 250/214 R, 214 A, 214 LA, 214 AL; 356/218, 223, 224, 226, 228; 330/59, 308

[56] References Cited

U.S. PATENT DOCUMENTS

| | | | |
|---|---|---|---|
| 4,218,613 | 8/1980 | Bletz | 250/214 A |
| 4,415,803 | 11/1983 | Muoi | 250/214 A |
| 4,492,931 | 1/1985 | Deweck | 330/308 |
| 4,521,920 | 6/1985 | Forsberg et al. | 359/189 |
| 4,574,249 | 3/1986 | Williams | 359/194 |
| 4,623,786 | 11/1986 | Rodwell | 330/59 |
| 4,742,575 | 5/1988 | Arita et al. | 359/194 |
| 4,764,732 | 8/1988 | Dion | 330/59 |
| 5,008,524 | 4/1991 | Reutter et al. | 359/59 |
| 5,023,951 | 6/1991 | Kahn | 359/189 |
| 5,025,456 | 6/1991 | Ota et al. | 375/76 |
| 5,061,865 | 10/1991 | Durst | 307/490 |
| 5,089,788 | 2/1992 | Shiga | 359/189 |
| 5,111,324 | 5/1992 | Jahromi | 359/189 |
| 5,113,151 | 5/1992 | Yamamoto et al. | 330/308 |
| 5,138,148 | 8/1992 | Sakura | 359/189 |
| 5,345,327 | 9/1994 | Savicki | 359/172 |
| 5,363,064 | 11/1994 | Mikamura | 359/194 |
| 5,373,152 | 12/1994 | Domon et al. | 250/214 AC |
| 5,430,765 | 7/1995 | Nagahori | 375/318 |
| 5,430,766 | 7/1995 | Ota et al. | 375/318 |
| 5,455,705 | 10/1995 | Gusinov | 359/189 |

*Primary Examiner*—Rafael Bacares
*Attorney, Agent, or Firm*—Blakely, Sokoloff, Taylor & Zafman

[57] ABSTRACT

A method and apparatus for receiving infrared signals are provided. The circuit includes preamplifier that includes an integrator that charges based on light detected by a photodiode. The circuit includes a warning circuit that generates a warning flag when the charge on the integrator exceeds a predetermined level. To prevent the integrator from saturation, digital logic resets the preamplifier by dumping the charge on the integrator in response to the warning signal. The digital logic is also configured to reset the integrator at predetermined intervals. When the incoming signal is encoded using pulse position modulation, the interval at which the integrator is reset is the length of a single time slot in the pulse position modulation frame. A sample and hold circuit is provided to hold a previous output of the preamplifier. The difference between the previous output of the preamplifier and the current output of the preamplifier is compared with a threshold voltage to detect pulses on the incoming signal.

11 Claims, 7 Drawing Sheets

5,790,295

GATED INTEGRATOR PREAMPLIFIER FOR INFRARED DATA NETWORKS

FIELD OF THE INVENTION

The present invention relates to a preamplifier, and more specifically, to a preamplifier for communication using infrared radiation.

BACKGROUND OF THE INVENTION

Infrared light is used to communicate information between devices in a variety of contexts. For example, infrared is currently used to control home consumer appliances and to allow computer devices to communicate with each other. The techniques used to encode information in infrared signals and the data rates of infrared communication vary from application to application. For example, infrared signals used to communicate with home consumer appliances have data rates in the range of tens of bits per second. On the other hand, sophisticated diffuse transceivers can have data rates as high as ten megabytes per second.

The recent popularity of portable computers and their associated peripherals, such as printers, telephone modems, scanners, and networks, has created the need for ad hoc data networking in which network connections can be made or broken in a relatively easy fashion. In particular, the ability to cause a portable computer to communicate with another infrared capable device by simply placing the portable computer within some proximity of the other device is very desirable.

Infrared data networks generally fall into two categories. The first category includes low cost, point-to-point, short range connections between two IR capable devices. Such connections have a typical range of a few feet, and are limited to line of sight configurations. The second category includes high cost, diffuse, long range systems with a range of 30-40 feet. Such systems are typically omnidirectional.

Infrared data communications has some advantages over radio methods in that data transmitted using infrared is relatively secure, and infrared circuitry is cheaper than the circuitry required for wireless radio links. A point-to-point connection between two devices may be constructed for very low cost, with one or two emitter LEDs. If more range is required, infrared emitters may be added to increase signal strength, at the expense of increased power requirements and cost. Diffuse systems, which have the largest range, may require up to ten emitters to fully cover a room.

Lower cost infrared systems generally use modulation schemes that work with simple receivers. For example, the low speed IRDA (Infra-red Developers Association) modulation technique works with receivers that consist of a simple photodiode amplifier and comparator. When increased distance is required, a more sophisticated receiver is used.

In more sophisticated pulse-based infrared systems, receivers typically include differentially opposed photo diodes and preamplifiers, a post-amplifier, an integrate and dump subsection phase locked to the incoming signal, and an automatic gain control. At the post-amplifier, the differential signal is amplified differentially.

When constructing the preamplifier for such higher performance systems, a trans-impedance configuration, such as that shown in FIG. 1, has some inherent advantages. Referring to the preamplifier 100 of FIG. 1, the input photodiode current enters the amplifier summing junction 102 which is at virtual ground. The current is then converted into voltage by a gain setting feedback resistor 104. In preamplifier 100, noise power increases linearly with increases in the resistance of resistor 104, but the signal output power increases as a square of the resistance of resistor 104. Consequently, the feedback gain setting resistor 104 is ideally made as to maximize the signal to noise ratio.

While the properties described above indicate that resistor 104 should be as large as possible, this can have undesired effects. Specifically, by raising the gain to a high level, it is much easier for the preamplifier 100 to be run up to the voltage supply rail by both the desired incoming signal (the "receive signal") and the ambient light, where the preamplifier will saturate. It is desirable to avoid such saturation in a way that does not contribute to the overall noise budget, or create base-line wander for low duty cycle modulation schemes in normal operation.

At present, techniques used to suppress ambient noise include AC coupling (shown in FIG. 2), the analog feedback technique shown in FIG. 3, and a slope measuring method described in U.S. Pat. No. 5,345,327 entitled "DIGITAL INFRARED COMMNICATIONS SYSTEM WITH EDGE DETECTION" issued to Savicki on Sep. 6, 1994.

According to the AC-coupling method, a preamplifier 200 includes a resistor 202 for converting the photo-diode current to a voltage. The voltage is then amplified by a voltage amplifier 204. This AC-coupling method is generally inferior in noise performance relative to the trans-impedance preamplifier 100 of FIG. 1.

The analog feedback technique shown in FIG. 3 modifies the trans-impedance configuration of FIG. 1 to better suppress the low frequency noise caused by ambient light. However, both the AC-coupling method of FIG. 2 and the analog feedback technique shown in FIG. 3 create base line wander where the incoming data train starts out with a non-zero average DC value and gradually wanders towards an average value of zero, as illustrated in FIG. 5.

For the circuit in FIG. 3, the baseline wander is at a time constant determined by the zero in the low pass state of the DC feedback network. For the preamplifier 200 in FIG. 2, the time constant is determined by the RC of the voltage gain resistor 202 and the input coupling capacitor 206. By not using a high pass filter on the front end, be it AC-coupled or the low-pass filter feedback, the need for equalization circuitry may be avoided.

Slope measurement, as described in U.S. Pat. No. 5,345, 327, recognizes that the essential difference between the signal and ambient light is frequency related. In the Savicki system, an analog differentiation circuit is used to distinguish between the receive signal and noise caused by ambient light. Preamplifier saturation is avoided by employing a high pass preamplifier frequency response. However, like the circuits in FIGS. 2 and 3, slope measurement techniques are subject to both baseline wander from the high pass filter in the amplifier stage and the inherent noise penalty of converting the photodiode current to a voltage via a resistor and then amplifying the subsequent voltage.

The ability of an infrared receiver to support a wide dynamic range is significant because a transmitter and receiver may be touching each other in the "close in" case, and may be as far away as 20'30 feet in the "far out" case. Typical infrared applications involve dynamic ranges from 10'20 nano-amps to 10'20 milliamps. These great extremes of signal levels (120 dB) can be very difficult to control by conventional Automatic Gain Control (AGC) methods, which would require multiple controlled gain stages to cover the very large dynamic range.

Sunlight and lighting used in home and business, particularly fluorescent lighting, creates noise which can degrade the signal to noise ratio at the receiver, create errors and limit range of the data link. Ambient light is usually produced by one of three sources: sunlight, incandescent bulbs (60 Hz plus harmonics) and fluorescent lights (60 Hz plus harmonics for the standard variety and 50–75 kHz plus harmonics for the energy saving variety). The ambient light is usually much greater in intensity than the actual signal that an infrared receiver is to detect. Thus, to create a robust network, the signal should preferably fall in the range above 500 kHz, and energy below 500 kHz should be suppressed. Preferably this suppression can be performed without the increased noise encountered in an analog feedback configuration, or the baseline wander associated with AC coupling.

SUMMARY OF THE INVENTION

The present invention provides a circuit for receiving infrared signals that supports a wide dynamic range. The present invention also provides a circuit that is substantially immune to interference caused by ambient light.

According to an embodiment of the invention, a gated trans-impedance integrator is used as the preamplifier. A sample and hold circuit is connected to the output of the trans-impedance integrator. Digital logic is used to control the integrate and dump process. The digital logic runs the preamplifier/integrator at the pulse rate of the incoming single, phase locked to the transmitter. The circuit amplifies the difference between integrator results taken at 0 (the sample and hold stored value) and T, where T signifies the pulse rate. As a result, signals with a poor signal to noise ratio may be recovered.

The lower frequency ambient sources are rejected, since the signal will show a much larger change in signal level between samples received at the pulse rate 1/T. Amplifier saturation is avoided through the placement of a comparator on the preamplifier output which converts a preamplifier output voltage approaching the positive or negative supply rails into a warning flag which is passed on to the digital logic. The digital logic, in turn, responds by resetting the preamplifier/integrator before the saturation point is reached.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

For the purposes of explanation, embodiments of the present invention shall be described with reference to pulse position modulation. However, the circuits described herein are useful for any digital modulation techniques where an integrator may be used in the receiver for improved signal reception.

Figure 1:
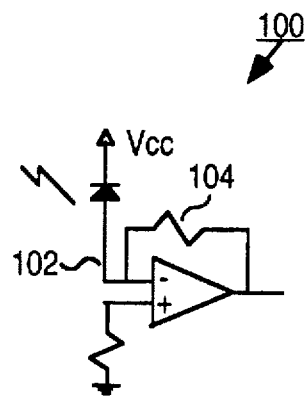
FIG. 1 illustrates a prior art trans-impedance preamplifier.
Figure 2:
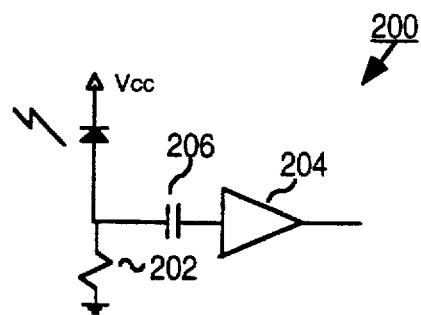
FIG. 2 illustrates a prior art AC-coupled preamplifier.
Figure 3:
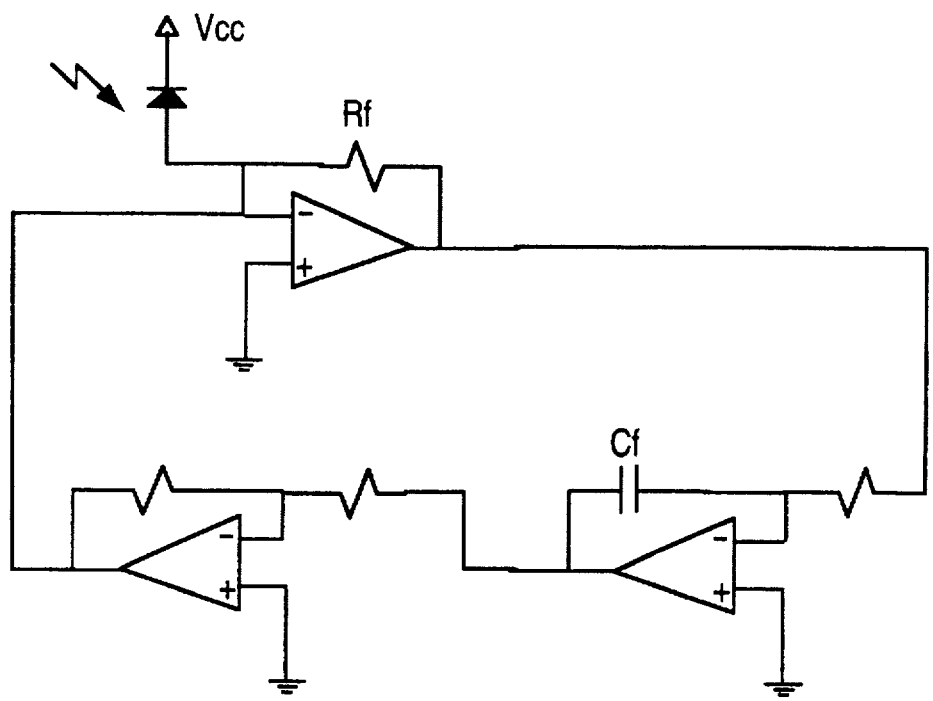
FIG. 3 illustrates a prior art preamplifier that uses analog feedback.
Figure 4:
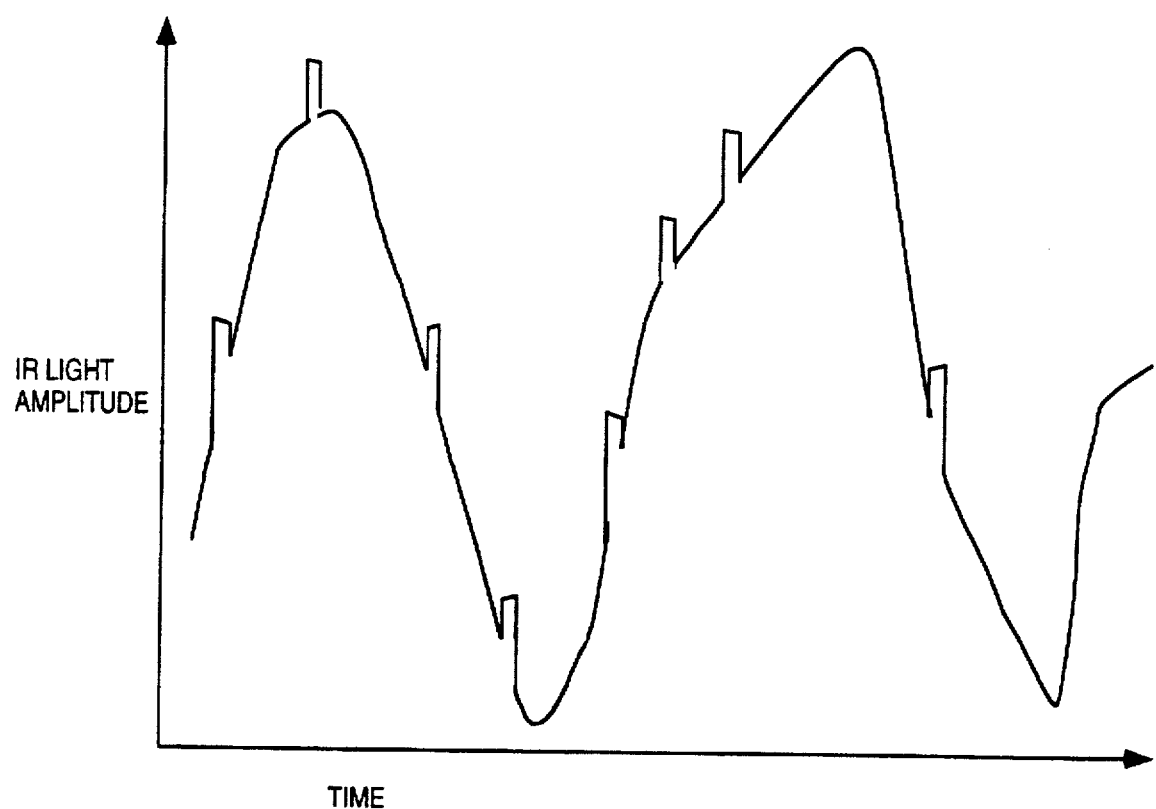
FIG. 4 illustrates a relatively low magnitude, high frequency signal combined with a relatively high magnitude, low frequency ambient light.
Figure 5:
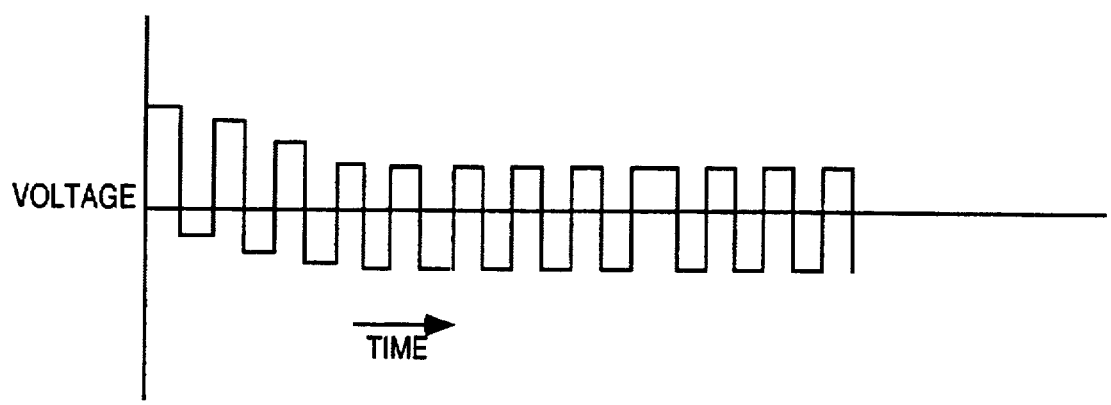
FIG. 5 illustrates baseline wander.
Figure 7:
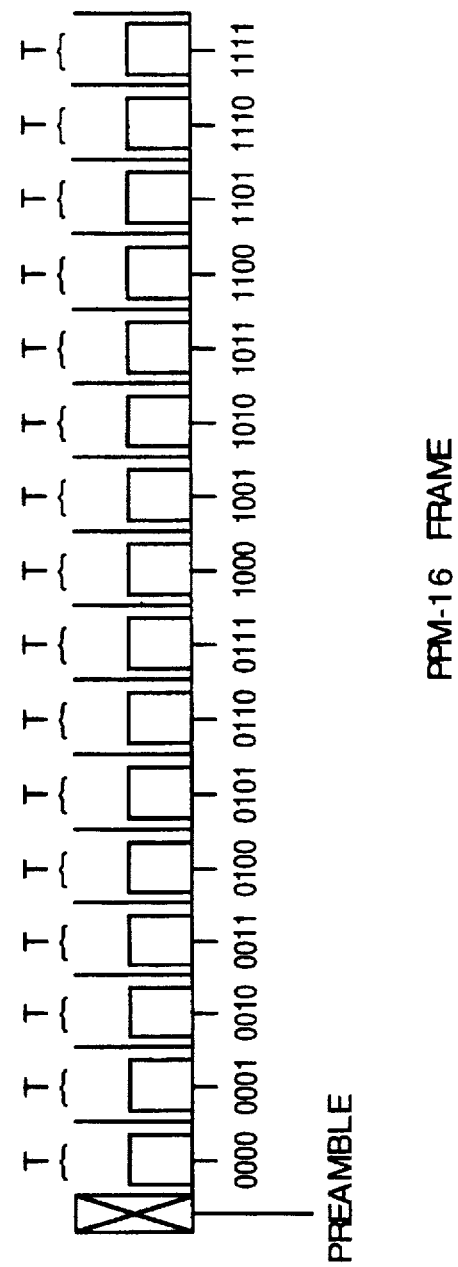
FIG. 7 illustrates a PPM-16 frame that may be used to encode data sent to the receiver illustrated in FIG. 6.

A sixteen slot pulse position modulation (PPM-16) frame is shown in FIG. 7. According to PPM-16 modulation, a transmitter transmits a pulse in one of 16 time slots. The receiver interprets the pulse by mapping the slot in which the data was received to a four data bit pattern that corresponds to the slot. Typically, the pulse transmitted will have a lower magnitude but a much higher frequency than the ambient light. Consequently, the light detected by an infrared receiver when pulse position modulation is used may appear as shown in FIG. 4.

Figure 6:
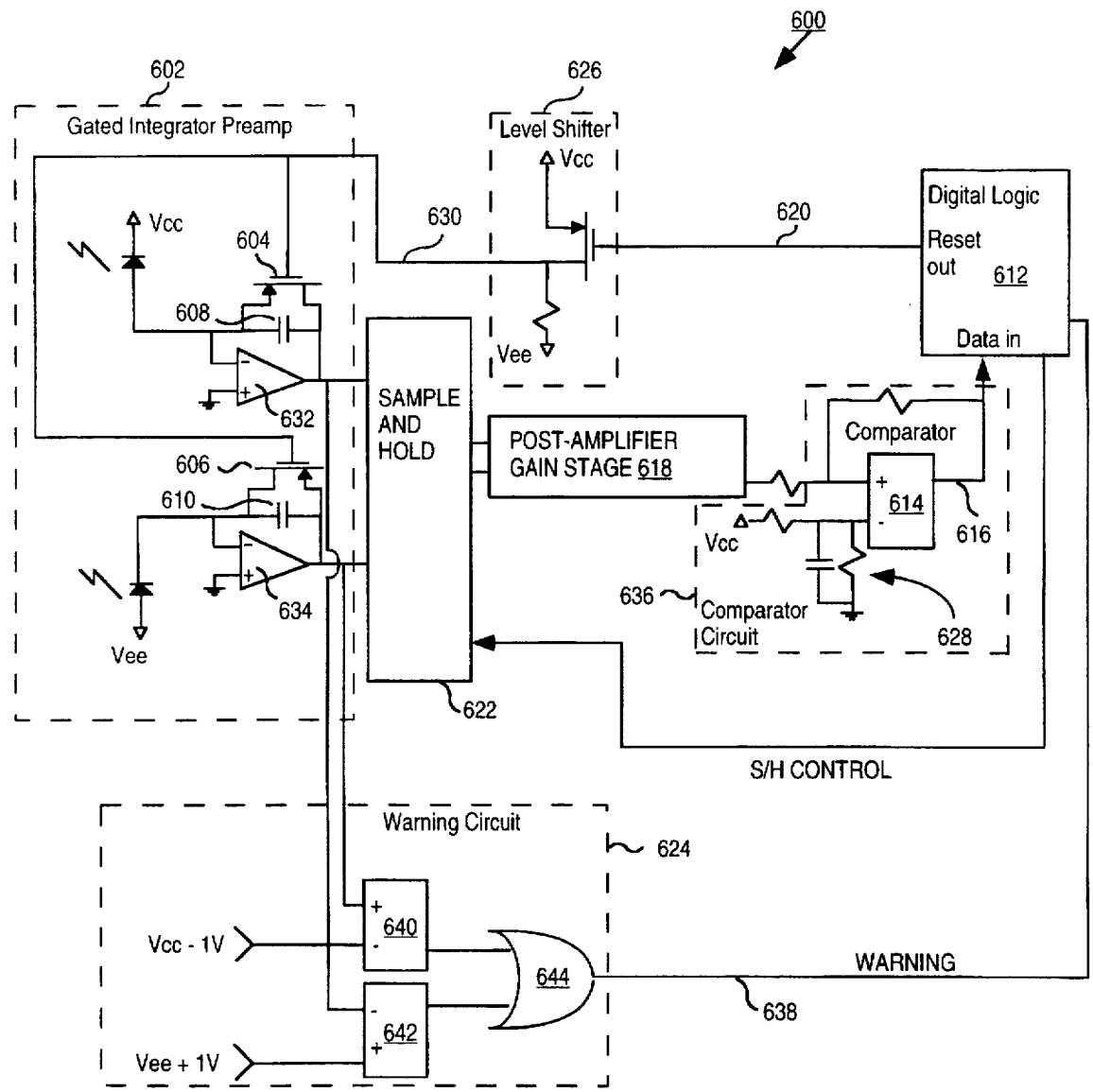
FIG. 6 illustrates an infrared receiver configured according to one embodiment of the present invention.

Referring to FIG. 6, it illustrates a circuit 600 for receiving infrared signals according to one embodiment of the invention. Circuit 600 generally includes a gated integrator preamplifier 602, a sample and hold circuit 622, a post-amplifier gain stage 618, a warning circuit 624, digital logic 612, a level shifter 626 and a comparator circuit 636. Preamplifier 602 is illustrated with differentially opposed photo diodes for receiving an infrared signal. However, in an alternative embodiment, the preamplifier may be single ended.

SATURATION PREVENTION

Circuit 600 solves the problem of supporting an extremely wide dynamic range of received signal, which can result in preamplifier saturation, by employing a gated integrator as a part of the first stage of the preamplifier 602 and automatically resetting the integrator prior to saturation. Specifically, the preamplifier 602 is configured with two sampling switches formed by transistors 604 and 606 that reset the integrator by shorting capacitors 608 and 610, respectively.

The transistors 604 and 606 are controlled by digital logic 612. When the transistors 604 and 606 are deactivated by a logic signal sent by digital logic 612 over line 620, capacitors 608 and 610 will be charged to the value of the preamplifier output. When the transistors 604 and 606 are activated by the logic signal sent by digital logic 612, capacitors 608 and 610 are short circuited, causing any charge stored thereon to be dumped. Error is minimized by using transistors 604 and 606 and amplifiers 632 and 634 as matched pairs.

Level shifter 626 causes the signal on line 630 to have a shifted voltage level relative to the signal on line 620. The voltage shift performed by level shifter 626 results in signal on line 630 that reflects voltage levels that ensure that transistors 604 and 606 will turn on and off accurately.

Prior to the transmission of PPM data frames, the transmitter typically sends a square wave at a frequency of 1/2T (where T is the duration of a single pulse time slot) as a preamble in order to provide a steady signal for the receiver to lock onto. Once the receiver has achieved lock, the digital logic 612 activates transistors 604 and 606 to dump the charge on capacitors 608 and 610 at a frequency equal to the duration of a single PPM time slot. The circuit used by digital logic 612 to generate the appropriately timed control signal over line 620 may include, for example, a phase locked loop (PLL) circuit that is periodically adjusted to maintain synchronization.

In addition to resetting the preamplifier 602 between PPM time slots, digital logic 612 resets the preamplifier 602 in response to a warning signal generated by warning circuit 624. Specifically, digital logic 612 monitors the state of the preamplifier saturation using warning circuit 624. Warning circuit 624 includes dual comparators 640 and 642 that compare the output of amplifiers 632 and 634 with predetermined DC voltages. If the output of amplifier 632 exceeds a predetermined voltage (e.g. Vee+1V) or if the output of amplifier 634 falls below a predetermined voltage (e.g. Vcc−1V), then signal at the output 638 of the OR gate 644 goes HIGH.

Preferably, the DC voltages with which the outputs of amplifiers 632 and 634 are compared are established at levels such that the signal on line 638 will go HIGH only when one or both of the amplifiers 632 and 634 in the preamplifier 602 is approaching saturation. The signal at the output 638 of comparator 644 is used as a warning flag to digital logic 612 that the gated integrator is approaching saturation. If the output voltage from the preamplifier has become large enough to activate the warning signal, the digital logic 612 sends a signal over line 620 to activate transistors 604 and 606. This resets the integrator in preamplifier 602 by dumping the charge on capacitors 608 and 610, thus preventing the saturation of the preamplifier 602. The post amplifier gain stage 618 is preferably an age-controlled or a limiting gain stage to prevent it from reaching saturation.

AMBIENT EFFECT PREVENTION

Figure 8:
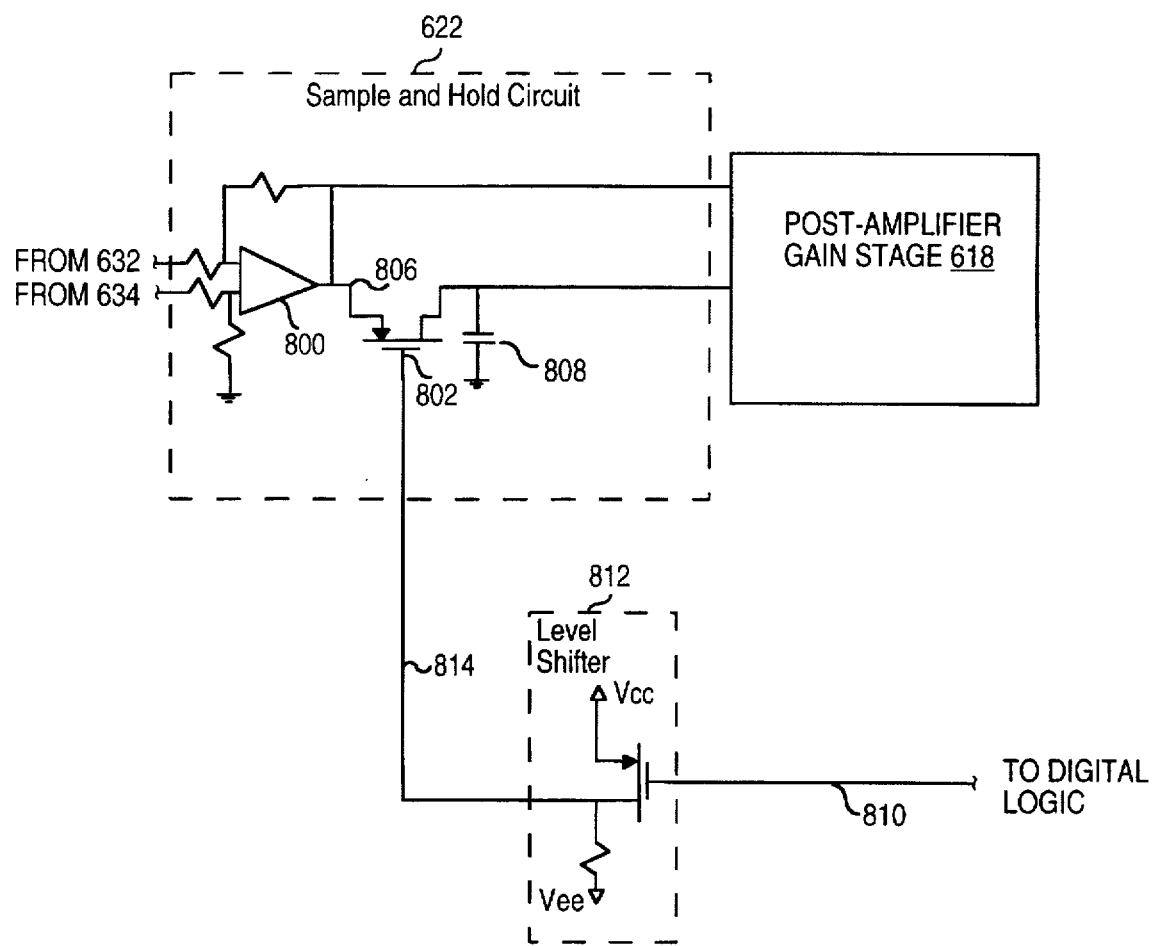
FIG. 8 shows an example of a sample and hold circuit.

The output of amplifiers 632 and 634 are sent to sample and hold circuit 622. Sample and hold circuit 622 is shown in greater detail in FIG. 8. Referring to FIG. 8, sample and hold circuit 622 includes an amplifier 800, a transistor 802 and a capacitor 808. The output of amplifier 800 reflects the amount of charge currently present on capacitors 608 and 610.

At the end of a given pulse time slot, digital logic 612 transmits a control signal over line 810 to activate transistor 802. In the illustrated embodiment, the voltage level of the control signal is shifted by a level shifter 812 prior to being applied to transistor 802 over line 814. Activation of transistor 802 causes capacitor 808 to charge to the voltage level of line 806. Transistor 802 is then deactivated.

With transistor 802 deactivated, the charge on capacitor 808 is not affected by subsequent changes of the voltage level on line 806. Digital logic 612 causes transistor 802 to remain deactivated until the end of the subsequent pulse time slot, when transistor 802 is again activated. Consequently, during any given pulse time slot, the voltage level on line 806 reflects the current output of the preamplifier (i.e. the output at time T) while line 808 reflects the output of the preamplifier during the previous pulse time slot (i.e. the output at time T−1).

Referring again to FIG. 6, post amplifier gain stage 618 receives these two signals from the sample and hold circuit 622 and amplifies the difference between the two signals. The amplified difference between the signals is fed to one input of comparator 614. The other input of comparator 614 is set at a constant voltage determined by circuit 628. When the amplified difference between the preamplifier output during the current time slot and the preamplifier output during the previous time slot exceeds the threshold voltage supplied by circuit 628, the output 616 of comparator 614 changes state. This change of state indicates to the digital logic 612 the presence of a pulse on the incoming infrared signal.

To understand how the gated integrator preamplifier 602 rejects low frequency ambient effects, assume that a large, low frequency light input is impressed on the photo diodes of circuit 600. When circuit 600 is integrating and dumping at a frequency much greater than the frequency of the ambient light, the output of the preamplifier 602 will tend to be the same from one sample to the next. The output values from a sample taken at the minimum amplitude point of a low frequency signal cycle to its maximum amplitude point, on the other hand, will vary a great deal. It will still be very difficult to saturate the preamplifier, however, since the RC time constant of the integrator is quite long relative to the time that the integrator is actually on before it is dumped. This gives a great improvement in terms of resistance to saturation via the ambient signal over the standard trans-impedance preamplifier.

For example, assume that the RC time constant is ten times the gating frequency of the integrator. Under these conditions, the signal required to drive the preamplifier to its rails would have to be 10 times as large as an equivalent signal into a standard type of trans-impedance amplifier. As stated previously, the integrator is activated for a period equal to the received pulse width, which is very short relative to the ambient frequency.

Since the output of the gated preamplifier will vary a great deal over a long period of time if a high magnitude, low frequency ambient signal with a much smaller signal component (such as the one in FIG. 4) is impressed upon the photodiode, circuit 600 detects characteristics which make the receive signal appear different from the ambient. The signal is different because the voltage difference it will cause between consecutive samples is much larger than the voltage difference between subsequent samples caused the ambient signal alone. Since circuit 600 detects pulses by comparing the signal strength of one slot time relative to the signal strength of the previous slot time, the comparison between the hold value (representing the preamplifier output at time T−1) and the present value (representing the preamplifier output at time T) provides a means of capturing the desired signal while rejecting the slower moving ambient.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A circuit for receiving infrared signals comprising:
   a photodiode configured to generate a signal in response to detected light;
   a preamplifier coupled to receive the signal from the photodiode, the preamplifier including an integrator that charges based on said signal from the photodiode;
   a warning circuit coupled to the preamplifier, the warning circuit generating a warning signal when the charge on the integrator exceeds a predetermined threshold; and
   a reset circuit coupled to the preamplifier and the warning circuit, the reset circuit being configured to reset the integrator in response to the warning signal.

2. The circuit of claim 1 wherein the reset circuit is further configured to reset the integrator at a predetermined frequency.

3. A circuit for receiving infrared signals comprising:
   a photodiode configured to generate a signal in response to detected light;
   a preamplifier coupled to receive the signal from the photodiode, the preamplifier including an integrator that charges based on said signal from the photodiode;

a warning circuit coupled to the preamplifier, the warning circuit generating a warning signal when the charge on the integrator exceeds a predetermined threshold;

a reset circuit coupled to the preamplifier and the warning circuit, the reset circuit being configured to reset the integrator in response to the warning signal;

a sample and hold circuit coupled to the preamplifier, the sample and hold circuit being configured to generate a first signal that reflects the current output of the preamplifier and a second signal that reflects a previous sampled output of the preamplifier; and a post-amplifier gain stage coupled between the sample and hold circuit and a digital logic, the post-amplifier gain stage generating an amplified signal the reflects the difference between the first signal and the second signal.

4. A circuit for receiving infrared signals comprising:

a photodiode configured to generate a signal in response to detected light;

a preamplifier coupled to receive the signal from the photodiode, the preamplifier including an integrator that charges based on said signal from the photodiode;

a warning circuit coupled to the preamplifier, the warning circuit generating a warning signal when the charge on the integrator exceeds a predetermined threshold, wherein the warning circuit includes a comparator, wherein a first input of the comparator is coupled to the integrator and a second input of the comparator is coupled to a source of a constant DC voltage, said comparator generating said warning signal when the voltage at said first input exceeds the voltage at said second input; and a reset circuit coupled to the preamplifier and the warning circuit, the reset circuit being configured to reset the integrator in response to the warning signal.

5. The circuit of claim 1 wherein said integrator stores a charge on a capacitor, said reset circuit resetting said integrator by causing a short between plates of said capacitor.

6. A circuit for receiving infrared signals comprising:

a photodiode configured to generate a signal in response to detected light;

a preamplifier coupled to receive the signal from the photodiode, the preamplifier including an integrator that charges based on said signal from the photodiode, said integrator storing a charge on a capacitor;

a warning circuit coupled to the preamplifier, the warning circuit generating a warning signal when the charge on the integrator exceeds a predetermined threshold;

a reset circuit coupled to the preamplifier and the warning circuit, the reset circuit being configured to reset the integrator in response to the warning signal, the reset circuit resetting said integrator by causing a short between plates of said capacitor; and a transistor coupled to short said capacitor in response to a control signal, said reset circuit being configured to reset said integrator by generating said control signal to said transistor.

7. A method for preventing saturation in an infrared receiver, the method comprising the steps of:

generating a signal in response to detecting an infrared signal on a photodiode;

charging a capacitor in an integrator based on the signal from the photodiode;

dumping the charge on the capacitor when either a predetermined period of time has elapsed since a previous time that the charge was dumped or a charge on said capacitor exceeds a predetermined threshold.

8. A method for preventing saturation in an infrared receiver, the method comprising the steps of:

generating a signal in response to detecting an infrared signal on a photodiode;

charging a capacitor in an integrator based on the signal from the photodiode;

dumping the charge on the capacitor when either a predetermined period of time has elapsed since a previous time that the charge was dumped or a charge on said capacitor exceeds a predetermined threshold;

determining when charge on said capacitor exceeds the predetermined threshold by applying a voltage that reflects the charge on the capacitor to a first input of a comparator; and applying a signal having a predetermined voltage level to a second input of the comparator.

9. A method for receiving a pulsed infrared signal in the presence of ambient light, comprising the steps of:

causing an integrator preamplifier to generate a first signal in response to detected light;

storing a first sample of said first signal taken during a first time slot;

comparing said first sample of said first signal with a second sample of said first signal to generate a difference signal, said second sample reflecting said first signal during a second time slot that is subsequent to said first time slot;

comparing said difference signal with a predetermined threshold voltage to generate a second signal; and detecting pulses on said pulsed infrared signal based on said second signal.

10. The method of claim 9 further comprising the step of resetting the integrator preamplifier at a predetermined frequency.

11. The method of claim 10 further comprising the steps of:

detecting when the first signal exceeds a predetermined threshold; and resetting the integrator preamplifier when the first signal exceeds the predetermined threshold.

* * * * *